F. S. BUCK.
MACHINE FOR TURNING IRREGULAR FORMS.
APPLICATION FILED OCT. 6, 1910. RENEWED SEPT. 12, 1914.

1,137,117.

Patented Apr. 27, 1915.
5 SHEETS—SHEET 1.

UNITED STATES PATENT OFFICE.

FRANK S. BUCK, OF SPRINGFIELD, VERMONT, ASSIGNOR TO GILMAN & SON, INC., OF SPRINGFIELD, VERMONT, A CORPORATION OF VERMONT.

MACHINE FOR TURNING IRREGULAR FORMS.

1,137,117.   Specification of Letters Patent.   Patented Apr. 27, 1915.

Application filed October 6, 1910, Serial No. 585,600.   Renewed September 12, 1914.   Serial No. 861,387.

*To all whom it may concern:*

Be it known that I, FRANK S. BUCK, of Springfield, in the county of Windsor and State of Vermont, have invented certain new and useful Improvements in Machines for Turning Irregular Forms, of which the following is a specification.

This invention relates to a turning machine or lathe adapted to turn irregular forms such as lasts, gun stocks, hat blocks, boot trees, etc., from wood, but particularly adapted for the production of lasts.

The chief object of the invention has been to produce an improved machine of this character adapted to cut sharply concave recesses, the curvatures of which are too sharp to permit of their being cut out by the machines heretofore in general use.

Other objects have been to improve and simplify the feed mechanism for the cutter carriage, and the means for retarding and accelerating the same when acting upon certain parts of the work, to provide an improved mode of drive for the cutter, permitting the latter to travel, and to arrange the cutters so that in being fed they are drawn against the work instead of being pushed into it.

In the accompanying drawings I have illustrated the principles of my invention as applied to a last lathe, for the purpose of illustration thereof and for the further reason that the invention has special applicability to machines for producing this class of work. It is to be noted, however, that the same principles apply to other machines of like character, and that the invention is not to be considered as limited to lathes designed to produce lasts only.

In the drawings.

The same reference characters indicate the same parts in all the figures.

Figure 1:
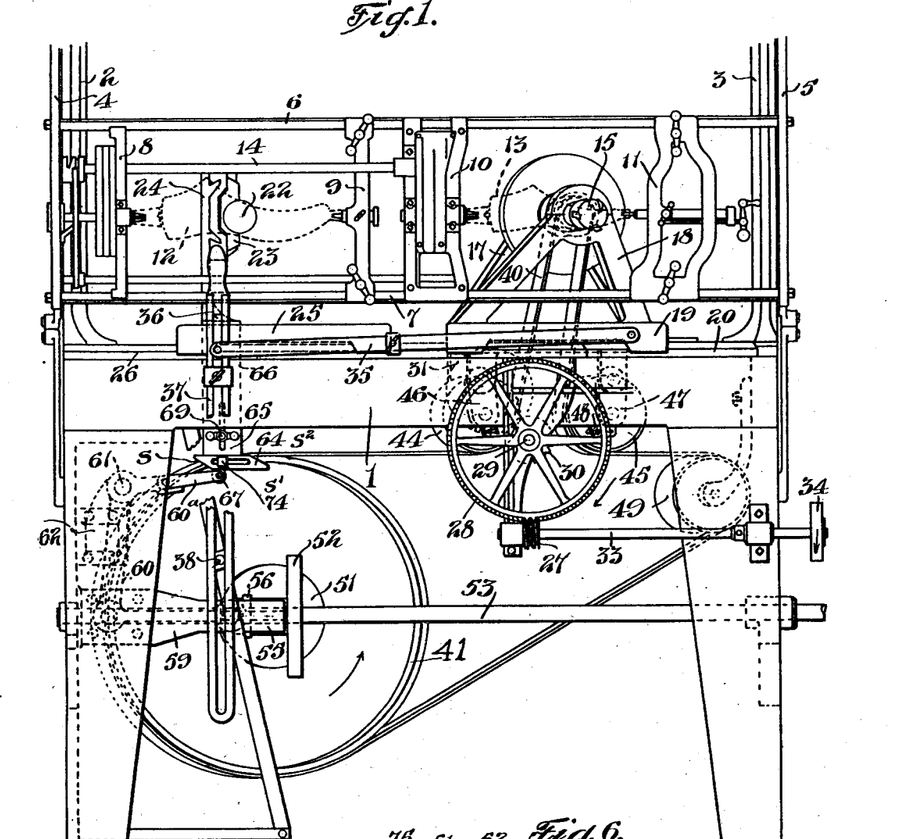
Figure 1 represents a front elevation of so much of a machine of this character as is sufficient to illustrate the present invention.
Figure 2:
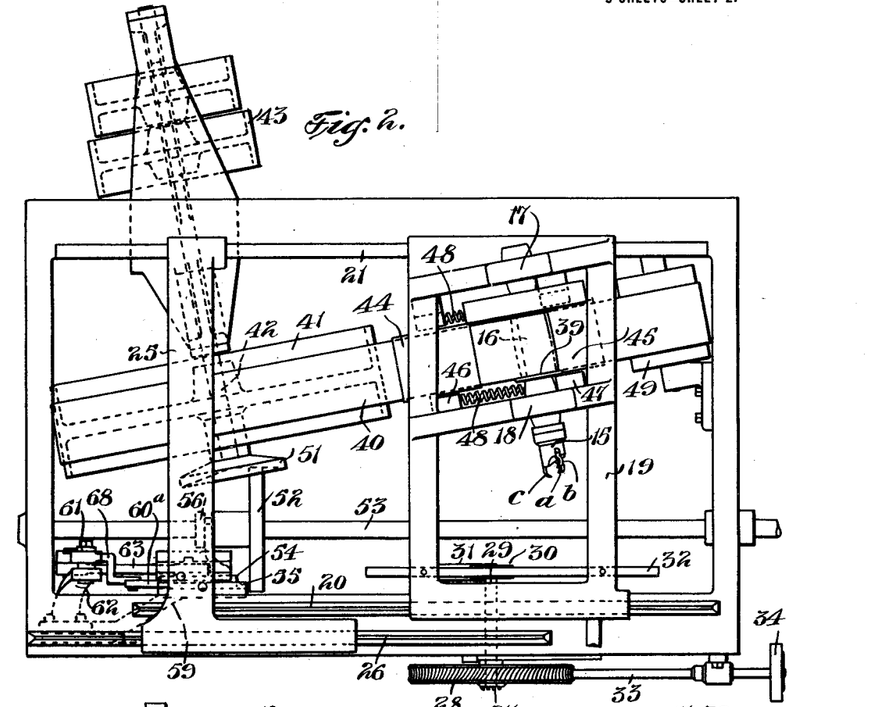
Fig. 2 represents a plan view of the same.

Referring to the drawings, and first to Figs. 1 and 2, the machine or lathe is shown as being formed with the base or frame 1 having uprights 2 and 3 to which is pivoted the swing carrying the model and the block from which a piece of work, such as a last, similar to the model is to be produced. The swing consists of the side arms 4 and 5 and the cross bars 6 and 7, which carry the head and tail stocks 8 and 9 for the model, and the head and tail stocks 10 and 11 for the work. The model is indicated in dotted lines at 12 and the work is similarly indicated at 13. The model and work are rotated simultaneously either in the same or opposite directions by a shaft 14 suitably driven. This portion of the machine is substantially the same as the corresponding parts of last lathes now in general use and illustrated in prior patents, hence, further detailed description thereof is deemed unnecessary.

The work is cut to a form similar to the model by means of cutters *a*, *b* and *c*, carried on a rotating cutter head 15, which is secured to a shaft 16 mounted in bearings 17 and 18 upon a carriage 19 which travels parallel to the axis of rotation of the model and work, being guided thereto by ways or guides 20, 21. The swing is vibrated by the rotation of the model in contact with a guide, causing the swing and work to vibrate toward and from the cutter and to feed more or less of the block to the cutter, thus shaping the block on the lines of the model. The guide is represented at 22 and is mounted upon a slide 23 adjustable on an upright 24 secured to a carriage 25, which also travels in the same direction and simultaneously with the carriage 19, being guided by the ways 26 and 21. The cutter carriage 19 is driven by a worm 27 meshing with a worm wheel 28 on the shaft 29 on which is a pinion 30 driving a gear 31 which meshes with the teeth of a rack 32 secured to the cutter carriage. The worm is on a shaft 33 driven by a belt surrounding a pulley 34. A simultaneous and equal, or greater or less, movement is imparted to the carriage 25 from the carriage 19 by means of a link 35 adjustable in length, one end of which is pivoted to the carriage 19 and the other to a slide 36 adjustable on a lever 37 pivoted upon an adjustable fulcrum 38 in the manner usual with machines of this class.

Figure 13:
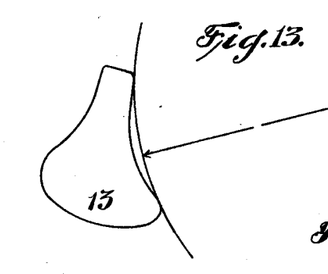
Figs. 13 and 14 are diagrammatic views illustrating the capability of the machine, as improved by my invention, to perform special work.
Figure 14:
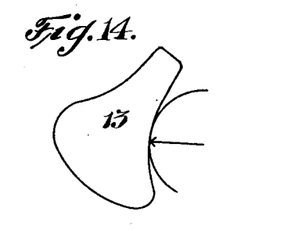
Figure 15:
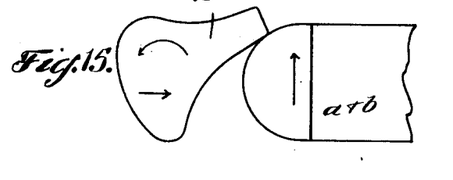
Figs. 15, 16 and 17 are similar views illustrating the progress of turning a last on my improved machine.
Figure 16:
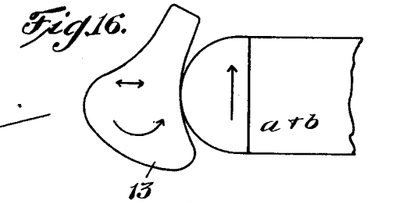
Figure 17:
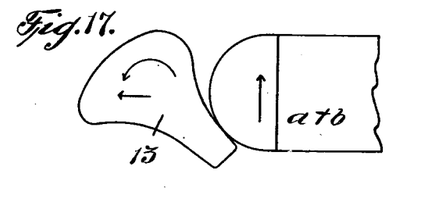
Figures 18, 19:
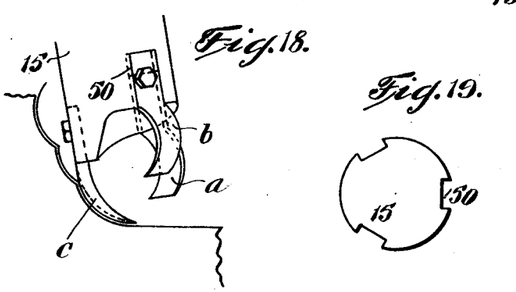
Fig. 18 is a plan view of my improved cutting tool showing diagrammatically its relation to the work.
Fig. 19 is an end view of the cutter head.

The first and most important improvement over the prior art which this invention contains is in the construction and arrangement of the cutter whereby the latter is adapted to cut out recesses or hollows of sharp curvature. To explain the importance of this feature it may be mentioned that recent styles in foot gear have compelled lasts to be made at the comb or instep with very narrow combs and sharply concave surfaces on each side thereof, as indicated in Figs. 13 to 17. In lasts of small size the radii of curvature of these concavities are very short, and indeed are less than the radius of the path in which the cutter travels. Fig. 13 represents by a circular arc the path in which the standard cutter now used travels. Against this path is placed a section of one of the thin comb lasts having the sharp concavities in its sides. As appears from this figure, the recess is so sharply curved that the cutter cannot enter it. According to my present invention I have devised a cutter of which the cutting edge or edges travel in a path of relatively abrupt curvature, as shown in Fig. 14, where the boundaries of the path in which the edge or edges travel are indicated by the arc of small radius. This arc is so sharply curved that it may come tangent with any part of the curved face of the last, whereby the cutter is enabled to hollow out the side of the last to the desired extent, and with the desired curvature. To enable the edge of the cutter to travel in a path of sufficiently sharp curvature, the cutter is so arranged that its axis of rotation, instead of being parallel with the axis of rotation of the work, is transverse thereto, the edge of the finishing cutter being so curved that in rotating it defines a surface of revolution of which a section is indicated by the curved lines in Figs. 14 to 17. By arranging the cutter in this manner, its cutting edge is enabled to travel in the desired path, while at the same time the cutter head and the shaft which carries it may be made sufficiently large and strong, and may be set back far enough from the work to avoid striking any part thereof projecting close beside a recessed part.

Figs. 1 and 2 show the arrangement of the cutter head and shaft relative to the work. From these figures it will be seen that the axis of the cutter is neither parallel to the axis of rotation of the work, nor perpendicular thereto, but preferably on a slightly oblique angle of about 80°. In order to drive the cutter so arranged, a new arrangement of driving means is provided. On the shaft of the cutter is a pulley 39 around which passes a belt 40, the said belt also passing around a large drum 41. The latter is secured upon a shaft 42, which extends beyond the base of the machine and carries a pulley 43 by which it is driven. This pulley is the one to which the power for driving the entire machine is delivered. The belt 40 is so arranged that it permits the carriage 19 to travel, and for this purpose the part of the belt which surrounds the pulley 39 is a bight which passes upward between guide pulleys 44 and 45 suspended from the under side of the carriage. These pulleys are journaled in brackets 46, 47, which are pivotally hung from the carriage, so that the pulleys may move together and apart, and are drawn together by springs 48, which maintain a tension of the belt. Beyond the carriage the belt passes around the stationary pulley 49. It will be readily understood that this construction enables the carriage to be moved back and forth, without affecting the tension of the belt, while, at the same time, the belt is caused to embrace a sufficient angular extent of the pulley 39. The drum 41 and pulley 49 are enough wider than the belt to accommodate the shift thereof due to its angularity with respect to the travel of the carriage.

Figure 20:
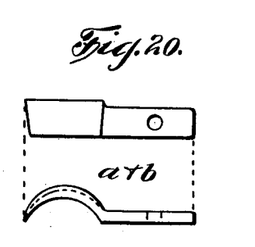
Fig. 20 represents two views of one of the cutters.
Figure 21:
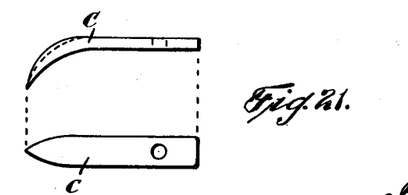
Fig. 21 represents two views of another of the cutters.

I have found that under most conditions the best number of knives or cutters to employ is three, these being arranged equidistantly around the periphery of the cutter head 15. They are set at different points along the length of the cutter head, having shanks which are set into longitudinal grooves 50 in the sides of the head. Two of these knives, as the scoring or roughing knives $a$ and $b$, are preferably similar, having the form shown in Fig. 20, their cutting edges being carried somewhat outwardly from the periphery of the cutter head and then curved inward. The third or finishing cutter $c$, however, has its edge extending almost in longitudinal alinement with the side of the cutter head and curved inward. The guide 22 against which the model bears, instead of being a wheel as in the usual form of last lathe, is a ball or stationary member having a superficial form similar to the path defined by the cutting edge of the finishing knife, being thus approximately spherical in curvature. By virtue of this form the guide is enabled to control the movements of the swing frame so that each point on the surface of the work as finished by the cutters, corresponds in its distance from the axis and from the ends in exact ratio with the corresponding point on the model engaged by the guide. In this way the pieces turned out are exact duplicates of the models, except for differences in grade. The progressive arrangement of the knives longitudinally of the cutter head is an important feature of the invention, in that it secures successive action of the knives on the work. Thus the scoring knives $a$ and $b$ which project laterally farther from the axis of the cutter head than the finishing knife, are also placed farther from the end of the cutter head than the finishing knife, in order to travel in different zones and consequently to cut additional amounts of stock from the work. To explain, if all the cutters traveled in the same zone, the first scorer $a$ would remove all the stock, leaving nothing for the second scorer and the finishing knife to remove. But by arranging them as described with reference to the length of the cutter head, and by arranging the cutter head on a slant as shown, and feeding it along the work in the direction of the slant, they are caused to perform their individual work, each cutting away stock left by its predecessor.

The obliquity of the cutter-carrying shaft 16 heretofore mentioned is such that it makes an angle less than a right angle with the direction of its travel when working. That is, the operative travel of the cutter head is from right to left in the herein illustrated embodiment of the machine, and the angle between the line of its operating travel, and its axis is an acute angle. This arrangement is a feature of considerable importance, as thereby the cutters are drawn up to and against the work, instead of being pushed into the work. Thus the severest strains of the cutters are applied upon those portions which are secured to the cutter head and are best able to stand the strains, whereas if the angle which the shaft makes with the line of operative travel were obtuse, the knives would be pushed against the work and the points which are least adapted to stand severe strains would be subjected to the greatest strains. Greater ease of operation is secured by this arrangement.

Power for driving the various parts of the machine is furnished from the shaft 42, heretofore mentioned. All of the parts except the cutter head are driven by this shaft through friction disks 51, 52, the latter of which is on a counter shaft 53 from which belting not shown conveys power to the desired point. The disk 52 is splined on shaft 53 and is so arranged that its periphery engages the face of disk 51. It is enabled to slide longitudinally of the shaft, and thereby to make contact with disk 51 at points near or remote from the circumference of the latter. Owing to the inclination of the shaft 42 with respect to shaft 53, the face of disk 51 is recessed to provide a conical surface of such pitch that the element thereof which engages the rim of disk 52 is parallel with the shaft 53 and therefore with the path of movement of disk 53. It will be readily seen that by moving disk 52 axially toward or from the circumference of disk 51, its speed is respectively increased or diminished, thereby causing the motions of the machine, including the rotation of the model and work and the travel of the cutter to be correspondingly accelerated or retarded. It is desirable to effect a retardation of these motions when the cutter is forming those parts of the last or other article which have the most abrupt curvature and the sharpest corners, as the instep and comb of the last. The means for effecting this retardation in the present machine is a novel and improved feature of the present invention, and is constructed and arranged as follows:—A slide 54 is mounted to move upon a guide 55 parallel with the shaft 53, and carries a fork 56 embracing the hub 57 of disk 52, and contained in a groove 58 in said hub. The guide is formed on or secured to a bracket 59 secured to one of the legs of the machine frame. A bell crank lever 60 is pivoted upon a stud 61 projecting from a second bracket 62 on the machine frame, and has an arm which is connected by a link 63 with the slide previously described. A second arm $60^a$ of the bell crank bears against a cam 64 which is carried by the model carriage 25, and is secured upon a block or plate 65, fastened to a bracket or arm 66 attached to the under side of the carriage 25 and hanging down therefrom. The cam is provided on the advancing end with a beveled surface $s$ and on its under side with a surface $s'$ parallel to its motion.

When the machine is first started the cutter and guide are placed adjacent to the right hand end of the block and model respectively, and the cam 64 is thus at the right of the anti-friction roll 67 carried on the end of the bell crank arm $60^a$, which is the element that directly engages the cam. The disk 52 is set at the point with relation to the disk 51 which gives the required speed for working on the toe of the last, which elevates the roll 67 above the bottom of the cam 64. In lathes of the character indicated the cutter proceeds from the toe toward the heel of the last, or from right to left with reference to Fig. 1 of the drawings. As the guide and cutter approach the comb of the model and block respectively, the surface $s$ of the cam engages the roll 67, depressing the same and moving the disk 52 to the left, or in other words toward the center of the driving disk 51, thus reducing the speed of feeding and of rotation of the model and work, and allowing more time for the cutter to shape the sharp corners at the comb of the last and cut out the hollows at the sides thereof. The substantially horizontal surface $s'$ of the cam retains the driving parts in this position until the end of the cam passes off the roll, when the disk 52 is moved in the opposite direction by a spring 67$^a$ which is secured at its opposite ends to projections on the bracket 59 and bell crank 60 respectively. On the return of the carriage a surface $s^2$ of the cam which is parallel to the surface $s$ previously mentioned, and on the opposite end of the cam therefrom, passes under the roll 67 and lifts the same with the arm 60$^a$. The latter is joined to the bell crank by means of the pivot 60$^b$ which allows its end carrying the roll to swing up without moving the bell crank as a whole, so that the cam does not shift the disk 52 farther than it is shifted by the spring 67$^a$, this construction being provided to enable the cam to return when the carriage is returned to starting position without affecting the relation of the friction disks to one another. The pivoted arm 68 drops after the cam has passed from under it sufficiently far to enable the inclined surface $s$ of the cam in its forward travel to depress the roll and shift the bell crank and speed disk as previously described.

Figure 3:
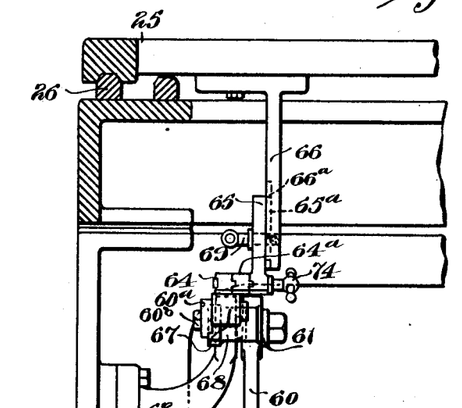
Fig. 3 is an end view as seen from the right of Fig. 1, of the means for controlling the speed of the tool carriage feeding mechanism.
Figures 4, 5:
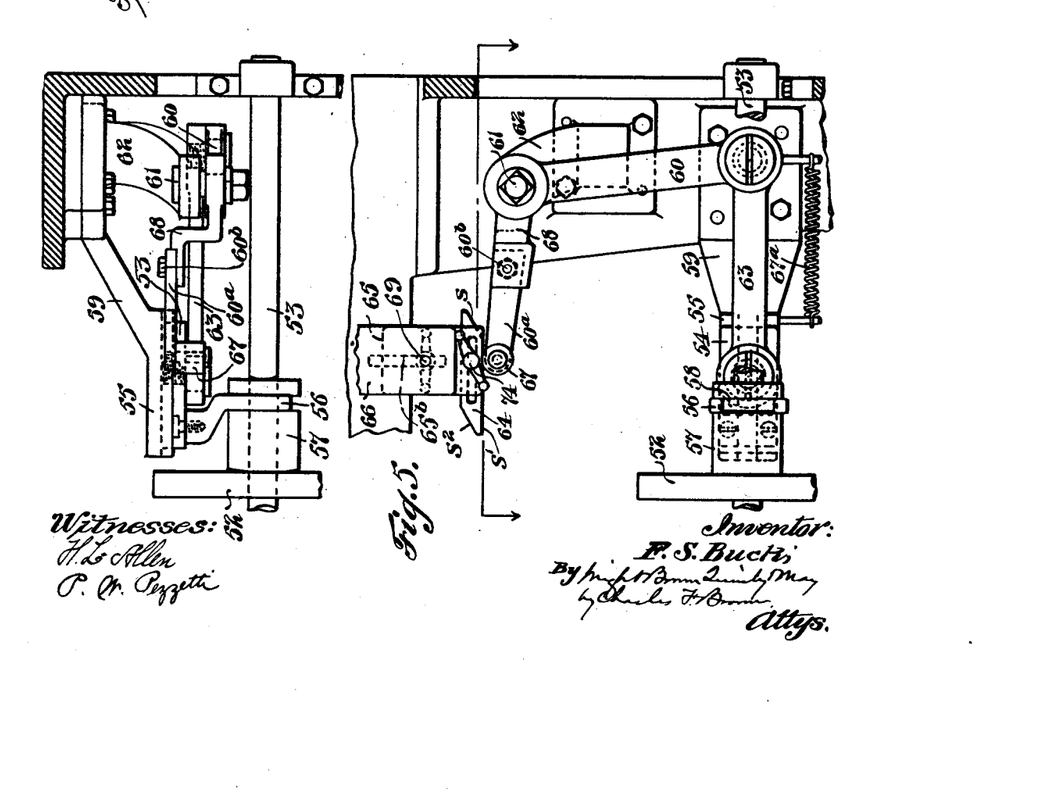
Fig. 4 is a plan view of the same.
Fig. 5 is an elevation of the same as seen from the right of Fig. 3, or from the rear of Fig. 1.
Figure 6:
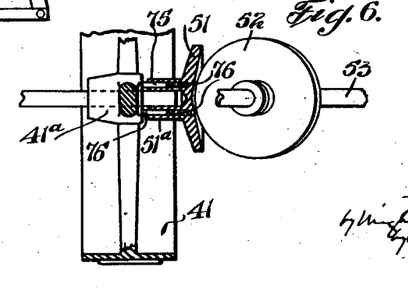
Fig. 6 is a detail view of a part of the feed mechanism.
Figures 7, 8:
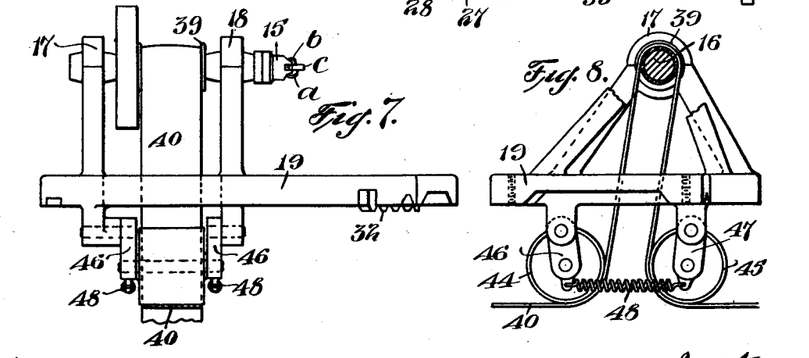
Figs. 7 and 8 are respectively side and front elevations of the mechanism for driving the cutter.
Figure 9:
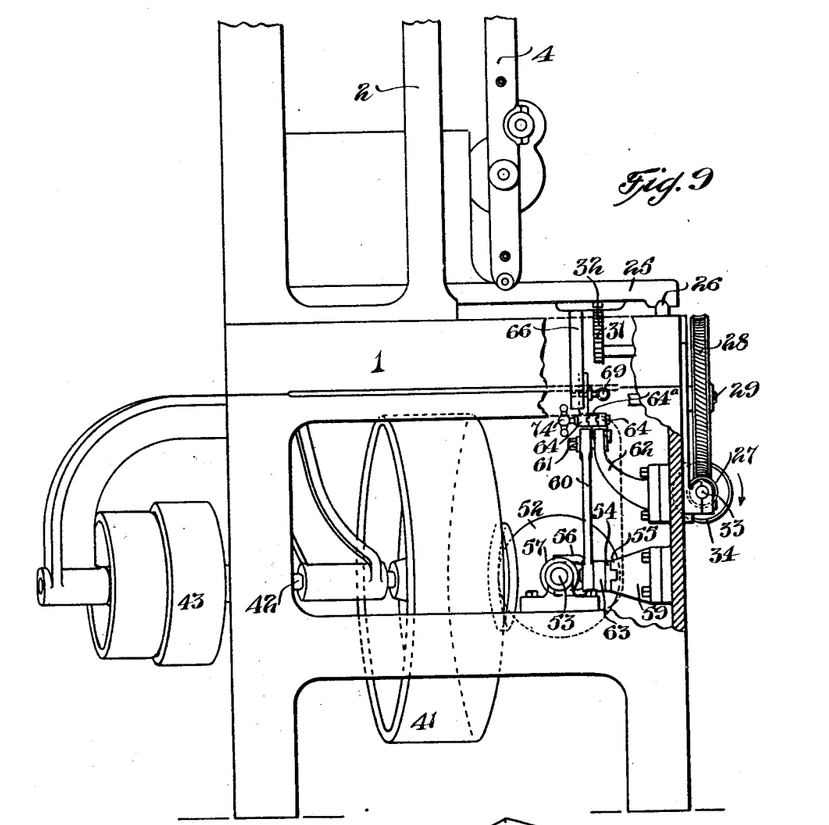
Fig. 9 is an end view of the machine.
Figures 10, 11, 12:
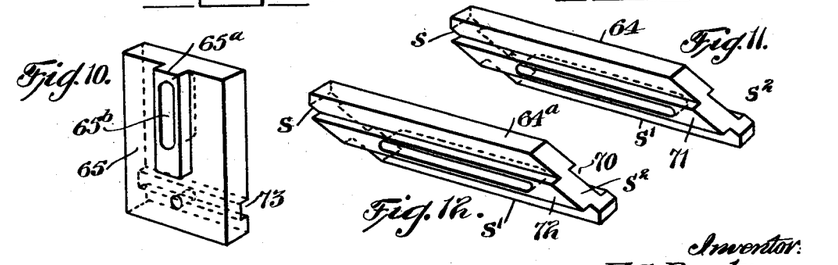
Figs. 10, 11 and 12 are details in perspective of the adjustable parts of the speed-changing mechanism.

Provision is made for adjusting the cam 64 both vertically and horizontally to vary the time at which the retardation of feed occurs and the amount and duration of such retardation. For this purpose the block or plate 65 is made vertically adjustable on the bracket 66, having a rib 65$^a$ engaged in a groove 66$^a$ of the bracket, and having a slot 65$^b$ through which a clamping bolt 69 extends, the bolt being threaded into the bracket. The cam is adjustable horizontally on the plate 65, and is also extensible in length, being composed of two parts 64 and 64$^a$ respectively, as shown in Figs. 3, 11 and 12. The part 64$^a$ of the cam is provided with a groove 70 on one face, which receives a rib 71 projected from the adjacent face of the part 64, and on its other side it has a rib 72 which enters a transverse groove 73 in the outer face of the plate 65. Both parts of the cam are longitudinally slotted and receive a clamp 74. The two parts of the cam are identical in outline, and the outer one is of less thickness than the face of the roll 67, as appears from Fig. 3. Thus the overlapping parts of both are engaged by the roll, and when one part is moved lengthwise beyond the end of the other, it produces a virtual elongation of the cam. Such elongation enables the length of time during which the slow speed continues and consequently the extent of the work which is affected by the slow speed, to be made as great as desired. With different models some variation is required both in the points at which the slow speed commences and ceases, and in the duration of the slow speed. These variations are taken care of by the adjustment which permits the cam to be lengthened or shortened, or shifted bodily back and forth. The amount of retardation is, of course, governed by the vertical position of the slide 65 carrying the cam. A yielding frictional pressure is maintained between the driving disks 51 and 52 by virtue of the manner in which the former disk is mounted. As appears from Fig. 6 said disk is formed with a hub 51$^a$ in close proximity to the hub 41$^a$ of the pulley 41. Pins 75 project from this hub into sockets in the hub 51$^a$ wherein are springs 76. The latter react against the pins 75 and so force the disk 51 against disk 52.

I claim,—

1. A machine for turning irregular objects comprising rotating pattern and work supports, a traveling rotating cutter head arranged with its axis oblique to the axis of rotation of the work-holder, and making an acute angle with a line running from the cutter head in the direction in which it travels while cutting, a plurality of cutters carried by the said cutter head at separated points on the periphery, and said cutters being respectively at different distances from the end thereof, and a guide arranged to be engaged by the pattern.

2. In a machine of the character stated having rotating holders for a pattern and for the work, a cutter holder mounted rotatively with its axis transverse to the axis of rotation of said work holder and making an acute angle with the direction of approching operative travel, and cutters secured detachably to the sides of said holder near the end thereof, and being so formed that their cutting edges extend beyond the end of the holder and inwardly toward the axis thereof.

3. In a machine of the character described, a cutter carrier consisting of a rotary shaft and a cutter head secured upon such shaft, and being inclined toward the work and with the line of feed, and cutters independent of each other secured at the periphery of the cutter head in different zones with respect to the axis thereof, one of the cutters having its edge extending beyond the end and curved toward the axis of rotation of the cutter head.

4. In a machine of the character described a cutter carrier consisting of a rotary shaft and a cutter head secured upon such shaft, a plurality of cutters detachably secured at angularly spaced points at the periphery and at one end of the cutter head with their cutting edges extending respectively beyond such end and outwardly from the head to different extents and curved toward the axis of rotation of the cutter head, and a guide arranged to be engaged by a pattern piece, and having an end shaped to conform with the surface of revolution defined by the edge of said cutter in its rotation.

5. A machine of the character described, comprising a swing frame, means for supporting an irregular model and a block on said frame, a cutter carriage arranged to travel longitudinally of the block from one end to the other, a cutter mounted rotatably on the said carriage on an axis inclined toward the block and making an acute angle with the direction of feeding travel.

6. A machine of the character described, comprising a swing frame, means for supporting an irregular model and a block on said frame, a cutter carriage arranged to travel longitudinally of the block from one end to the other, a cutter mounted rotatably on the said carriage on an axis inclined toward the block and making an acute angle with the direction of feeding travel, said cutter including cutting elements in different longitudinal zones and projecting to different extents from the said axis.

7. A last lathe including a swing frame carrying a model and work, a carriage movable longitudinally past the work, a cutter head mounted rotatively on said carriage, its axis extending at an angle to the axis of the work, and peripheral roughing and finishing cutters mounted on said cutter so that their cutting edges extend beyond the end thereof nearest the work, the roughing cutter projecting radially farther than the finishing cutter, and the latter projecting axially farther than the former, whereby to secure a progressive action on the work.

8. In a machine of the character described, a cylindrical cutter head mounted to rotate about its longitudinal axis, a bit or cutter having a shank secured to the side of said cutter head and a blade extending on a curve outwardly from the head, beyond the end of the head, and inwardly toward the axis of the head, and a second bit or cutter having a shank secured to the side of the cutter head at a point angularly separated from the point of attachment of the first bit, said second cutter having a blade extending axially beyond the first cutter and curved at its end toward the axis of the cutter head.

9. A lathe for turning irregular forms, comprising in addition to a swing frame having means for carrying a model and work, a cutter and guide carriages movable along the model and work, a cutter head rotatably mounted upon the cutter carriage, a cutter mounted on the cutter head and having its cutting edge projecting from the end thereof, such head being so arranged with respect to the work and the direction of travel as to cause the parts of the cutter nearer to the head to first engage the work.

10. In a last lathe, a cutter carriage, a cutter head mounted rotatively on said carriage with its axis at an acute angle with respect to the advancing travel of the carriage, and cutters attached to said head and extending toward the work from their points of attachment, being caused by the acute obliquity of the axis to act from their attached ends toward their outer ends.

11. In a machine of the character described, means for rotating a work piece, a cutter carriage movable parallel to the axis of the work piece, and a cutter head rotatably mounted in said carriage and having a plurality of bits provided with curved cutting edges extending beyond the end of the head and toward the axis thereof, the edge of one of said bits being farther from the axis and nearer to the end of the head than the edge of another bit and also arranged to travel in overlapping paths.

12. In combination with a machine for turning irregular forms, a cutter instrument inclined toward and with the line of feed and toward the work, substantially as described.

13. In combination with a machine for turning irregular forms, a cutter instrument inclined toward the work and with the line of feed and provided with an upper roughing portion and a finishing portion at the tip of the instrument, substantially as described.

14. A machine for turning irregular forms comprising means for holding and rotating a work piece, a cutter carriage, a cutter rotatively mounted on said carriage extending therefrom toward the axis of the work piece having cutting elements projecting beyond its end, means for giving a feed movement to the carriage, said carriage being guided parallel to the axis of rotation of the work piece, and the axis of the cutter being at such inclination with the axis of the work piece as to make an acute angle therewith on the side toward which it is moved during the feeding travel.

15. A machine for turning irregular objects comprising rotating pattern and work supports, a traveling cutter head arranged with its axis inclined to the axis of the work holder and at an acute angle with the line of travel of the cutter head, and a cutter on said cutter head.

16. In a machine for turning irregular objects, a cutter carriage arranged to travel in a predetermined path, a shaft mounted rotatably in said carriage at an oblique angle to the path at which it travels, and a cutter head secured on said shaft, the angle between the shaft and the direction of working travel of the carriage at the cutter head being less than a right angle.

17. In a machine for turning irregular objects, the combination with a rotating work piece and a rotating cutter head, of means for so moving said cutter head that it is drawn past the work in a direction making an acute angle with its axis of rotation, whereby the base portion of the cutter is caused to act first upon the work.

18. A machine designed for turning objects having sharply concaved surfaces, including a work holder arranged and operated to rotate the work, a cutter carrying shaft, a cutter head mounted on the end of said shaft having a roughing cutter near its base and a finishing cutter more remote from its base, and means for producing a movement of travel between the work and cutter head in such a direction as to cause the roughing cutter to act first upon the work.

19. In a machine for turning irregular articles, in combination with a rotating work holder and a rotating cutter carrier, a cutter mounted on said carrier and rotating about the axis thereof, and means for supporting said cutter carrier with its axis at an inclination to the axis of rotation of the work, whereby to permit employment of a cutter having a smaller radius than could otherwise be used, and means for producing a relative operative travel between the cutter and work in a direction approximately parallel to the axis of rotation of the work and making an acute angle with the axis of rotation of the cutter.

In testimony whereof I have affixed my signature, in presence of two witnesses.

FRANK S. BUCK.

Witnesses:
HERBERT H. BLANCHARD,
W. W. SLACK.